United States Patent
Deepak et al.

(10) Patent No.: US 11,926,903 B2
(45) Date of Patent: *Mar. 12, 2024

(54) ETCHING OF ALKALI METAL COMPOUNDS

(71) Applicant: Applied Materials, Inc., Santa Clara, CA (US)

(72) Inventors: Nitin Deepak, Maharashtra (IN); Tapash Chakraborty, Maharashtra (IN); Prerna Sonthalia Goradia, Mumbai (IN); Visweswaren Sivaramakrishnan, Cupertino, CA (US); Nilesh Chimanrao Bagul, Bangalore (IN); Bahubali S. Upadhye, Bangalore (IN)

(73) Assignee: Applied Materials, Inc., Santa Clara, CA (US)

( * ) Notice: Subject to any disclaimer, the term of this patent is extended or adjusted under 35 U.S.C. 154(b) by 48 days.

This patent is subject to a terminal disclaimer.

(21) Appl. No.: 17/836,578

(22) Filed: Jun. 9, 2022

(65) Prior Publication Data
US 2022/0396732 A1    Dec. 15, 2022

(30) Foreign Application Priority Data
Jun. 9, 2021   (IN) .............................. 202141025658

(51) Int. Cl.
| | |
|---|---|
| C23F 1/00 | (2006.01) |
| C09K 13/00 | (2006.01) |
| C23F 1/10 | (2006.01) |
| C23F 1/12 | (2006.01) |
| C23F 1/44 | (2006.01) |
| C23F 4/02 | (2006.01) |

(52) U.S. Cl.
CPC ............ *C23F 1/00* (2013.01); *C09K 13/00* (2013.01); *C23F 1/10* (2013.01); *C23F 1/12* (2013.01); *C23F 1/44* (2013.01); *C23F 4/02* (2013.01)

(58) Field of Classification Search
None
See application file for complete search history.

(56) References Cited

U.S. PATENT DOCUMENTS

| | | | | |
|---|---|---|---|---|
| 4,520,084 A | * | 5/1985 | Tinker ................... | H01M 4/12 |
| | | | | 429/231.95 |
| 2002/0025684 A1 | | 2/2002 | Butterbaugh et al. | |
| 2009/0291545 A1 | | 11/2009 | Taylor et al. | |
| 2022/0162747 A1 | * | 5/2022 | Chakraborty ......... | C23C 16/545 |

FOREIGN PATENT DOCUMENTS

| | | |
|---|---|---|
| EP | 0167279 A1 | 1/1986 |
| JP | H07219237 A | 8/1995 |

OTHER PUBLICATIONS

"Physicochemical Properties of Alkoxides: Regularities in the Homologous Series", The Chemistry of Metal Alkoxides (2002), 2 pages.
"Synthesis and Thermal Properties of Some Lithium β-Diketonates", Russian Journal of Coordination Chemistry, 2006, vol. 32, No. 2, pp. 126-129.
"Thermodynamic Study of a Series Lithium β-Diketonates", Journal of Thermal Analysis and Calorimetry, vol. 86 (2006) 2, 537-539.
Charles, Robert G., et al., "Comparative Heat Stabilities of Some Metal Acetylacetonate Chelates", Westinghouse Research Laboratories, 1957, vol. 62, pp. 440-444.
PCT International Search Report and Written Opinion in PCT/US2022/032686 dated Sep. 23, 2022, 10 pages.

* cited by examiner

*Primary Examiner* — Jiong-Ping Lu
(74) *Attorney, Agent, or Firm* — Servilia Whitney LLC

(57) ABSTRACT

Methods for etching alkali metal compounds are disclosed. Some embodiments of the disclosure expose an alkali metal compound to an alcohol to form a volatile metal alkoxide. Some embodiments of the disclosure expose an alkali metal compound to a β-diketone to form a volatile alkali metal β-diketonate compound. Some embodiments of the disclosure are performed in-situ after a deposition process. Some embodiments of the disclosure provide methods which selectively etch alkali metal compounds.

20 Claims, No Drawings

ETCHING OF ALKALI METAL COMPOUNDS

CROSS-REFERENCE TO RELATED APPLICATIONS

This application claims priority to Indian Patent Application No. 202141025658, filed Jun. 9, 2021, the entire disclosure of which is hereby incorporated by reference herein.

TECHNICAL FIELD

Embodiments of the disclosure generally relate to methods of etching alkali metal compounds. In particular, embodiments of the disclosure relate to methods of etching alkali metal compounds performed in-situ after an alkali metal-based deposition process.

BACKGROUND

Alkali metals are highly reactive materials. Similarly, alkali metal compounds (e.g., oxides, nitrides) often react readily with atmospheric conditions. These reactions can be highly exothermic and even explosive. Accordingly, alkali metal compounds, including lithium metal, require a high degree of care during processing.

Alkali metal materials have become attractive materials for the formation of energy cells. These energy cells are often used to power small electronic devices, thereby necessitating the need for increasingly smaller sizes with increasingly larger energy capacities.

To this end, many of the technologies currently used for manufacturing semiconductor materials are being applied to the manufacture of alkali metal-based energy cells. These technologies and methods include the use of vacuum processing chambers for physical vapor deposition (PVD) and chemical vapor deposition (CVD) type processing schemes.

Unfortunately, these methods often deposit material on parts of the processing apparatus other than the target substrate. As identified above, particularly in the case of alkali metals, this material can prove hazardous if allowed to build up within the chamber. Yet, the alkali metals typically have relatively low melting points and very few volatile derivatives.

Accordingly, there is a need for methods to etch or remove alkali metal compounds.

SUMMARY

One or more embodiments of the disclosure are directed to a method of etching an alkali metal compound. The method comprises exposing the alkali metal compound to an alcohol to form a volatile metal alkoxide.

Additional embodiments of the disclosure are directed to a method of etching an alkali metal compound. The method comprises exposing the alkali metal compound to a β-diketone to form a volatile alkali metal β-diketonate compound.

DETAILED DESCRIPTION

Before describing several exemplary embodiments of the disclosure, it is to be understood that the disclosure is not limited to the details of construction or process steps set forth in the following description. The disclosure is capable of other embodiments and of being practiced or being carried out in various ways.

As used in this specification and the appended claims, the term "substrate" refers to a surface, or portion of a surface, upon which a process acts. It will also be understood by those skilled in the art that reference to a substrate can also refer to only a portion of the substrate unless the context clearly indicates otherwise. Additionally, reference to depositing on a substrate can mean both a bare substrate and a substrate with one or more films or features deposited or formed thereon.

A "substrate" as used herein, refers to any substrate or material surface formed on a substrate upon which film processing is performed during a fabrication process. For example, a substrate surface on which processing can be performed include materials such as silicon, silicon oxide, strained silicon, silicon on insulator (SOI), carbon doped silicon oxides, amorphous silicon, doped silicon, germanium, gallium arsenide, glass, sapphire, and any other materials such as metals, metal nitrides, metal alloys, and other conductive materials, depending on the application. Substrates include, without limitation, semiconductor wafers. Substrates may be exposed to a pretreatment process to polish, etch, reduce, oxidize, hydroxylate, anneal, UV cure, e-beam cure and/or bake the substrate surface. In addition to film processing directly on the surface of the substrate itself, in the present disclosure, any of the film processing steps disclosed may also be performed on an underlayer formed on the substrate as disclosed in more detail below, and the term "substrate surface" is intended to include such underlayer as the context indicates. Thus for example, where a film/layer or partial film/layer has been deposited onto a substrate surface, the exposed surface of the newly deposited film/layer becomes the substrate surface.

One or more embodiments of the disclosure are directed to methods of etching alkali metal compounds. In some embodiments, the alkali metal compound comprises a pure metal, a metal oxide, a metal nitride or combinations thereof. In some embodiments, the alkali metal of the alkali metal compound comprises one or more of lithium, sodium, potassium, rubidium, or cesium. In some embodiments, the alkali metal of the alkali metal compound comprises or consists essentially of lithium. In some embodiments, the alkali metal compound consists essentially of lithium metal.

As used in this regard, a material or reactant which "consists essentially of" a stated material or compound comprises greater than or equal to about 95%, greater than or equal to about 97%, greater than or equal to about 98%, greater than or equal to about 99%, or greater than or equal to about 99.5% of the stated material or compound on an atomic or molar basis, respectively. In the case of a reactant, the molar percentage excludes any inert diluent or non-reactive carrier gases.

In some embodiments, the methods are performed within a processing chamber comprising a bottom, sidewalls and a chamber lid. In some embodiments, the processing chamber further comprises one or more gas supply and/or vacuum lines for providing reactants to the processing chamber and removing excess reactants or reaction byproducts. In some embodiments, the processing chamber further comprises a substrate support pedestal for supporting a substrate comprising an exposed alkali metal compound. In some embodiments, the substrate support pedestal comprises a heater for maintaining the substrate at a predetermined temperature.

Some embodiments of the disclosure advantageously provide methods of etching alkali metal compounds which can be performed in-situ, without vacuum break or exposure of the substrate to atmospheric conditions between deposition and etching. Without being bound by theory, it is believed that at least some of the in-situ methods disclosed herein prevent the exposure of alkali metal compounds, specifically lithium metal, to atmospheric conditions which would lead to a highly exothermic or explosive reaction.

Some embodiments of the disclosure provide methods for etching an alkali metal compound. In some embodiments, the method comprises exposing the alkali metal compound to an alcohol to form a volatile metal alkoxide. In some embodiments, the method further comprises removing the volatile metal alkoxide.

In some embodiments, the method comprises exposing the alkali metal compound to a β-diketone to form a volatile alkali metal β-diketonate compound. In some embodiments, the method further comprises removing the volatile alkali metal β-diketonate compound.

As used in this regard, a "volatile" reaction product is gaseous under the processing conditions of the method. "Volatile" byproducts are capable of being removed by vacuum from the substrate surface or the adjacent processing region.

In some embodiments, the alkali metal compound is converted prior to exposure to the alcohol or the β-diketone. In some embodiments, the alkali metal compound is oxidized to form an alkali metal oxide. In some embodiments, oxidizing the alkali metal compound comprises exposing the alkali metal compound to one or more of $H_2O$, $CO_2$, $O_2$, $O_3$ or $O_2$ plasma. In some embodiments, the alkali metal compound is nitride to form an alkali metal nitride. In some embodiments, nitriding the alkali metal compound comprises exposing the alkali metal compound to one or more of $N_2$, $NH_3$, $N_2O$, $NO_2$, hydrazine, or plasmas thereof. In some embodiments, the alkali metal compound is reduced to form an alkali metal. In some embodiments, reducing the alkali metal compound comprises exposing the alkali metal compound to one or more of $H_2$, or $H_2$ plasma.

In some embodiments, the alcohol comprises one to six carbon atoms. In some embodiments, the alcohol is linear, branched or cyclic. In some embodiments, the alcohol comprises more than one hydroxyl group.

In some embodiments, the alcohol comprises or consists essentially of one or more of methanol, ethanol, propanol, isopropanol, butanol, sec-butanol or tert-butanol. In some embodiments, the alcohol consists essentially of isopropanol.

In some embodiments, the β-diketone comprises one or more of dipivaloylmethane (HDPM), hexafluoroacetylacetonate (HHFA), pivaloyltrifluoroacetone (HPTA), trifluoroacetylacetone (HTFA), or combinations thereof.

In some embodiments, the alkali metal is exposed to a coflow of the alcohol or the β-diketone and a carrier gas. In some embodiments, the carrier gas is non-reactive. As used in this regard, the presence of a "non-reactive" gas does not impact the reaction thermodynamics or otherwise react with the alkali metal compound. In some embodiments, the carrier gas comprises one or more of hydrogen, helium, nitrogen, neon, argon, or xenon. In some embodiments, the alcohol or the β-diketone is pulsed into a constant flow of the carrier gas.

In some embodiments, the method is performed in one or more cycles. In some embodiments, each cycle comprises exposing the alkali metal compound to the alcohol or β-diketone for a pulse time and purging the volatile metal alkoxide or volatile alkali metal β-diketonate for a purge time. In some embodiments, the method cycles are repeated to etch a predetermined thickness of the alkali metal compound.

In some embodiments, the pulse time is in a range of 0.1 s to 10000 s, in a range of 0.1 s to 1000 s, in a range of 0.1 s to 120 s, in a range of 0.5 s to 60 s, in a range of 1 s to 30 s or in a range of 1 s to 15 s. In some embodiments, the pulse time is greater than or equal to 0.1 s, greater than or equal to 0.5 s, greater than or equal to 1 s, greater than or equal to 2 s, or greater than or equal to 5 s, and less than or equal to 60 s, less than or equal to 30 s, less than or equal to 15 s, less than or equal to 10 s, or less than or equal to 5 s. In some embodiments, the pulse time is about 2 s, about 5 s, about 10 s, or about 20 s.

In some embodiments, the purge time is shorter than the pulse time. In some embodiments, the purge time is in a range of 0.01 s to 10000 s, in a range of 0.01 s to 1000 s, in a range of 0.01 s to 100 s, in a range of 0.01 s to 10 s, in a range of 0.05 s to 5 s, in a range of 0.1 s to 2 s or in a range of 0.1 s to 1 s. In some embodiments, the purge time is greater than or equal to 0.01 s, greater than or equal to 0.05 s, greater than or equal to 0.1 s, greater than or equal to 0.2 s, or greater than or equal to 0.5 s, and less than or equal to 5 s, less than or equal to 2 s, less than or equal to 1 s, or less than or equal to 0.5 s. In some embodiments, the pulse time is about 0.2 s, about 0.5 s, about 1 s, or about 2 s.

As mentioned above, in some embodiments, the temperature of the alkali metal compound is maintained at a temperature in a range of 50° C. to 200° C., in a range of 80° C. to 200° C., or in a range of 100° C. to 175° C.

In some embodiments, the method is performed under vacuum. In some embodiments, the vacuum pressure is in a range of 0.01 mbar to 100 mbar, in a range of 0.1 mbar to 5 mbar, in a range of 0.5 mbar to 2 mbar, or in a range of 0.7 mbar to 1.7 mbar.

In some embodiments, the alkali metal compound is etched at a rate in a range of 1 micron/minute to 50 microns/minute, in a range of 1 micron/minute to 20 microns/minute, in a range of 1 micron/minute to 10 microns/minute, or in a range of 2 micron/minute to 8 microns/minute. In some embodiments, the alkali metal compound is etched at a rate greater than or equal to 1 micron/minute, greater than or equal to 1 micron/minute, greater than or equal to 1 micron/minute, or greater than or equal to 1 micron/minute, and less than or equal to 50 microns/minute, less than or equal to 40 microns/minute, less than or equal to 30 microns/minute, less than or equal to 20 microns/minute, less than or equal to 10 microns/minute, or less than or equal to 5 microns/minute.

In some embodiments, the method selectively etches the alkali metal material over other exposed materials. In some embodiments, the other exposed materials comprise copper or stainless steel.

As used in this specification and the appended claims, the term "selective etching" of one material over another material, and the like, means that a first amount of the one material and a second amount of the other material are etched, where the second amount is less than the first amount, or no etching of the other material is observed.

The term "over" used in this regard does not imply a physical orientation of one surface on top of another surface, rather a relationship of the thermodynamic or kinetic properties of the chemical reaction with one exposed material relative to the other exposed material. For example, selectively etching a metal material over a dielectric material means that the metal material is etched and less or no dielectric material is etched; or that the etching of the metal material is thermodynamically or kinetically favorable relative to the dielectric material.

The selectivity of an etch process may be expressed as a multiple of etch rate. For example, if one surface is etched 25 times faster than another surface, the process would be described as having a selectivity of 25:1. In this regard, higher ratios indicate more selective processes. In some embodiments, the method has a selectivity of greater than or equal to 50, greater than or equal to 100, greater than or equal to 500, greater than or equal to 1000, greater than or equal to 5000, or greater than or equal to 10000.

Reference throughout this specification to "one embodiment," "certain embodiments," "one or more embodiments" or "an embodiment" means that a particular feature, structure, material, or characteristic described in connection with the embodiment is included in at least one embodiment of the disclosure. Thus, the appearances of the phrases such as "in one or more embodiments," "in certain embodiments," "in one embodiment" or "in an embodiment" in various places throughout this specification are not necessarily referring to the same embodiment of the disclosure. Furthermore, the particular features, structures, materials, or characteristics may be combined in any suitable manner in one or more embodiments.

Although the disclosure herein has been described with reference to particular embodiments, those skilled in the art will understand that the embodiments described are merely illustrative of the principles and applications of the present disclosure. It will be apparent to those skilled in the art that various modifications and variations can be made to the method and apparatus of the present disclosure without departing from the spirit and scope of the disclosure. Thus, the present disclosure can include modifications and variations that are within the scope of the appended claims and their equivalents.

What is claimed is:

1. A method of etching an alkali metal compound, the method comprising exposing the alkali metal compound to an alcohol for a pulse time to form a volatile metal alkoxide and purging the volatile metal alkoxide for a purge time.

2. The method of claim 1, wherein the alkali metal compound comprises one or more of a pure metal, a metal oxide or a metal nitride.

3. The method of claim 1, wherein the alkali metal compound consists essentially of lithium.

4. The method of claim 1, wherein the alcohol comprises one to six carbon atoms.

5. The method of claim 4, wherein the alkali metal compound consists essentially of lithium.

6. The method of claim 5, wherein the pulse time is in a range of from 0.5 sec to 60 sec and the purge time is in a range of from 0.05 sec to 5 sec.

7. The method of claim 5, wherein the exposure and purge operations are repeated to etch a predetermined thickness of the alkali metal compound.

8. The method of claim 5, wherein the alcohol is pulsed into a constant flow of an inert carrier gas.

9. The method of claim 1, wherein the alcohol comprises one or more of one or more of methanol, ethanol, isopropanol or tertiary butanol.

10. The method of claim 1, wherein the alkali metal compound is maintained at a temperature in a range of from 50° C. to 200° C.

11. The method of claim 1, wherein the method is performed under vacuum at a pressure in a range of from 0.01 mbar to 100 mbar.

12. The method of claim 1, wherein the alkali metal compound is exposed to a coflow of the alcohol and an inert carrier gas.

13. The method of claim 12, wherein the inert carrier gas comprises one or more of Ar, Xe or Ne.

14. The method of claim 1, wherein the alkali metal compound is etched at a rate in a range of 1 micron per minute to 20 microns per minute.

15. The method of claim 1, wherein the method selectively etches the alkali metal compound relative to stainless-steel or copper materials.

16. A method of etching an alkali metal compound, the method comprising exposing the alkali metal compound to a β-diketone to form a volatile alkali metal β-diketonate compound.

17. The method of claim 16, wherein the alkali metal compound comprises lithium.

18. The method of claim 16, wherein the alkali metal compound consists essentially of lithium and the method further comprises oxidizing the alkali metal compound to form an alkali metal oxide prior to exposure to the β-diketone.

19. The method of claim 18, wherein oxidizing the alkali metal compound comprises exposing the alkali metal compound to one or more of $H_2O$, $O_2$, $O_3$ or $O_2$ plasma.

20. The method of claim 16, wherein the β-diketone comprises one or more of dipivaloylmethane (HDPM), hexafluoroacetylacetonate (HHFA), pivaloyltrifluoroacetone (HPTA) or trifluoroacetylacetone (HTFA).

* * * * *